United States Patent
Ma (10) Patent No.: US 11,781,612 B2
(45) Date of Patent: Oct. 10, 2023

(54) NONLINEAR SPRING CONNECTION STRUCTURE AND MOTOR

(71) Applicant: AAC Technologies Pte. Ltd., Singapore (SG)

(72) Inventor: Jie Ma, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 416 days.

(21) Appl. No.: 16/994,697

(22) Filed: Aug. 17, 2020

(65) Prior Publication Data

US 2020/0408272 A1 Dec. 31, 2020

Related U.S. Application Data

(63) Continuation of application No. PCT/CN2019/093951, filed on Jun. 29, 2019.

(51) Int. Cl.
| | |
|---|---|
| *F16F 9/54* | (2006.01) |
| *F03G 1/06* | (2006.01) |
| *F16F 9/32* | (2006.01) |
| *H02K 41/03* | (2006.01) |

(52) U.S. Cl.
CPC ............... *F16F 9/54* (2013.01); *F03G 1/06* (2013.01); *F16F 9/3207* (2013.01); *H02K 41/03* (2013.01)

(58) Field of Classification Search
CPC .............. F16F 9/54; F16F 9/3207; F03G 1/06
See application file for complete search history.

(56) References Cited

U.S. PATENT DOCUMENTS

| 2015/0021840 A1* | 1/2015 | Murayama | F16F 3/12 267/140.4 |
| 2017/0019011 A1* | 1/2017 | Wang | H02K 33/16 |
| 2018/0297064 A1* | 10/2018 | Mao | B06B 1/045 |

FOREIGN PATENT DOCUMENTS

| CN | 205178823 U | * | 4/2016 | |
| CN | 205792139 U | * | 12/2016 | |
| CN | 108566066 A | * | 9/2018 | ............. H02K 33/04 |
| CN | 216112161 U | * | 3/2022 | |

* cited by examiner

*Primary Examiner* — Melody M Burch
(74) *Attorney, Agent, or Firm* — W&G Law Group (57) ABSTRACT

The present disclosure discloses a nonlinear spring connection structure and a motor. The nonlinear spring connection structure includes a stator, a mover and an elastic connector provided between the stator and the mover. The elastic connector includes a first end connected with the stator, a second end connected with the mover and at least two transition-connecting portions connected between the first end and the second end. The at least two transition-connecting portions extend from the first end towards the second end with sequentially decreasing sizes. An elastic connector is provided between a stator and a mover. In practice, the elastic connector, through deformation of itself, provides a restoring force for the mover during movement, so that the mover can perform a linear movement relative to the stator. In this way, a nonlinear spring connection structure is simpler and manufacturing cost of the nonlinear spring connection structure is reduced.

8 Claims, 8 Drawing Sheets

NONLINEAR SPRING CONNECTION STRUCTURE AND MOTOR

TECHNICAL FIELD

The present disclosure relates to the technical field of spring structure, in particular a nonlinear spring connection structure used in a motor.

BACKGROUND

In the market, most springs in spring connection structures are linear springs, and a mover can only perform telescopic movement in one direction relative to a stator through a linear spring. In order to enable the mover to perform nonlinear movement relative to the stator, those skilled in the art combine multiple metal springs or replace an original linear spring with a magnetic spring, so as to realize nonlinear motion of the mover relative to the stator.

However, it is complex in structure and costly to combine multiple metal springs or to use a magnetic spring to realize a spring connection structure in which a mover performs the nonlinear motion relative to the stator.

Therefore, it is necessary to provide a nonlinear spring connection structure to solve the problems of complicated structure and high cost of the existing spring connection structure that can realize nonlinear motion.

SUMMARY

The present disclosure aims to provide a nonlinear spring connection structure of a simple structure and low cost.

The technical solutions of the present disclosure are as follows:

In order to achieve the above objective, the present disclosure provides a nonlinear spring connection structure, including a stator, a mover and an elastic connector provided between the stator and the mover. The elastic connector includes a first end connected with the stator, a second end connected with the mover and at least two transition-connecting portions connected between the first end and the second end. The at least two transition-connecting portions extend from the first end towards the second end with sequentially decreasing sizes.

As an improvement, the at least two transition-connecting portions include a first transition-connecting portion connected with the first end, and a second transition-connecting portion connected between the first transition-connecting portion and the second end. A size of the first transition-connecting portion is greater than a size of the second transition-connecting portion.

As an improvement, an end surface of the second end that the end surface being close to the second transition-connecting portion is larger than an end surface of the second transition-connecting portion that the end surface being close to the second end.

As an improvement, the mover has a first side surface and a second side surface that are adjacently connected with each other; the mover is provided with a first installation slot and a second installation slot that extend sequentially from the first side surface into the mover; both the first installation slot and the second installation slot extend to the second side surface; the second end is seized in the second installation slot, and the second transition-connecting portion passes through the first installation slot.

As an improvement, the mover further has a third side surface adjacently connected with the first side surface and disposed opposite to the second side surface, the first installation slot and the second installation slot are disposed through the second side surface and the third side surface.

As an improvement, the second end includes a rectangular plane connected with the second transition-connecting portion and a first arc surface having two ends respectively connected with edges of two opposite sides of the rectangular plane.

As an improvement, the second transition-connecting portion and the first end are rectangular structures; the first transition-connecting portion includes two second arc surfaces, and the two second arc surfaces respectively extend to edges of two opposite sides of the second transition-connecting portion from edges of two opposite sides of the first end with a decreasing distance between the two second arc surfaces.

As an improvement, the elastic connector is a part integrally made of elastic rubber.

As an improvement, the stator includes a frame, the mover is provided in the frame, and the first end is connected with an inner side wall of the frame.

The present disclosure further provides a motor having the nonlinear spring connection structure as described above.

The present disclosure is advantageous in that, in the present disclosure, an elastic connector is provided between a stator and a mover, and the elastic connector is disposed as including a first end connected with the stator, a second end connected with the mover and at least two transition-connecting portions connected between the first end and the second end, the at least two transition-connecting portions extending from the first end towards the second end with sequentially decreasing sizes. In this way, in practice, the elastic connector, through deformation of itself, provides a restoring force for the mover during movement, so that the mover may perform a linear movement relative to the stator. As a result, a nonlinear spring connection structure is simpler and manufacturing cost of the nonlinear spring connection structure is reduced.

REFERENCE SIGNS

1: nonlinear spring connection structure; 10: stator; 11: frame; 20: mover; 21: first side surface; 22: second side surface; 23: third side surface; 24: slot; 241: first installation slot; 242: second installation slot; 30: elastic connector; 31: first end; 32: second end; 321: rectangular plane; 322: first arc surface; 33: first transition-connecting portion; 331: second arc surface; 34: second transition-connecting portion.

DETAILED DESCRIPTION

A further description is provided on the present disclosure with reference to the drawings and embodiment.

It shall be noted that in the present disclosure, all directional expressions (such as up, down, inner, outer, top, bottom, etc.) are merely used for explaining relationships of relevant locations between different parts under a certain circumstance (as shown in the drawings). If a circumstance changes, a directional expression changes also.

It shall be noted that when an element is expressed as "fixed to" or "disposed on" another element, the former element may be directly on the other element, or there may be a third element in between. When an element is expressed as "connected to" another element, the former element may be directly connected to the other element, or there may be a third element in between.

Referring to FIG. 1 to FIG. 8, an embodiment of the present disclosure provides a nonlinear spring connection structure 1, including a stator 10, a mover 20, and an elastic connector 30 which is a part made of elastic material such as rubber. The elastic connector 30 is provided between the stator 10 and the mover 20. The elastic connector 30, through deformation of itself, provides a restoring force for the mover 20 during movement, so that the mover 20 may perform a linear movement relative to the stator 10.

Figure 1:
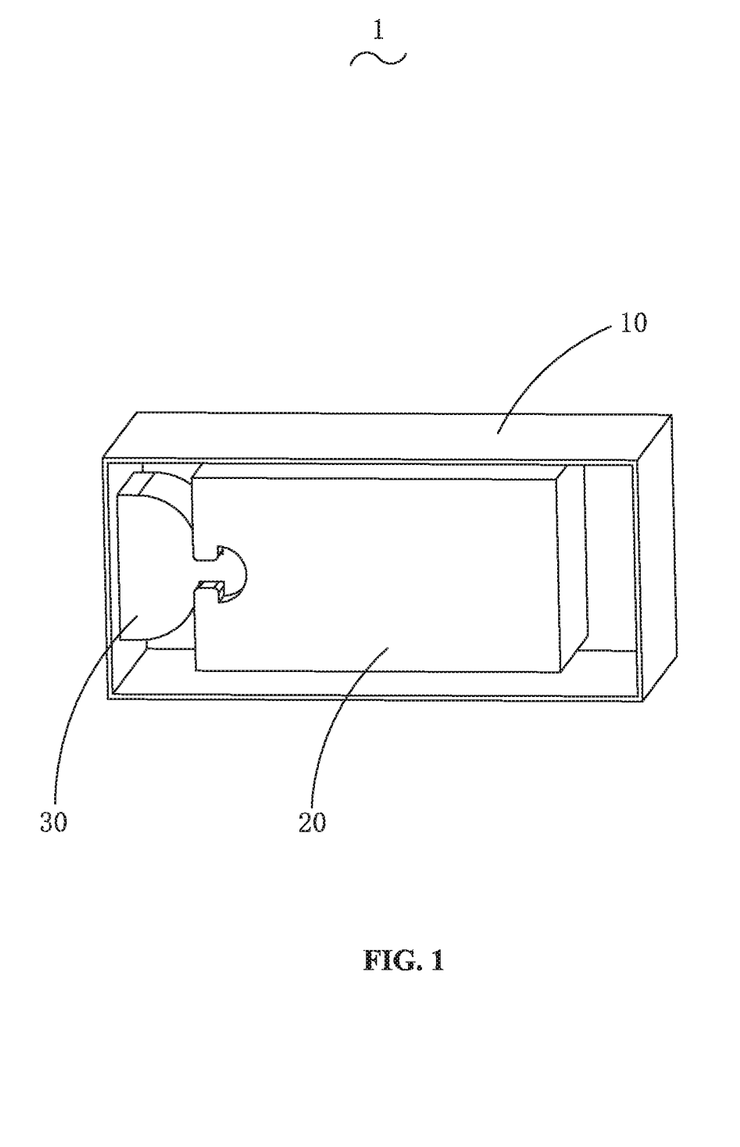
FIG. 1 is a three-dimensional view of a nonlinear spring connection structure according to an embodiment of the present disclosure.

In this embodiment, the stator 10 includes a frame 11 which is a rectangular structure. The mover 20 is disposed in the frame 11. One end of the elastic connector 30 is connected with an inner side wall of the frame 11, while the other end of the elastic connector 30 is connected with the mover 20, so as realize installation and fixing between the mover 20, the stator 10 and the elastic connector 30.

Figure 2:
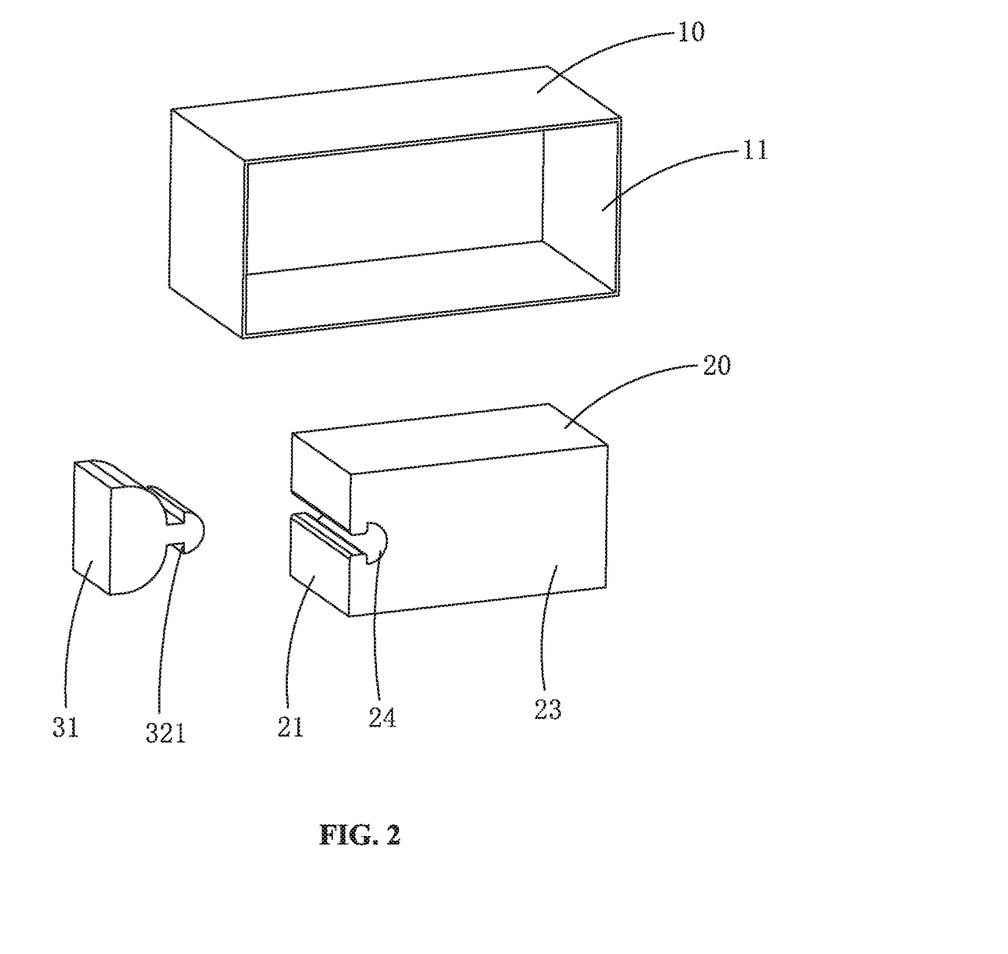
FIG. 2 is an exploded view of FIG. 1.
Figure 3:
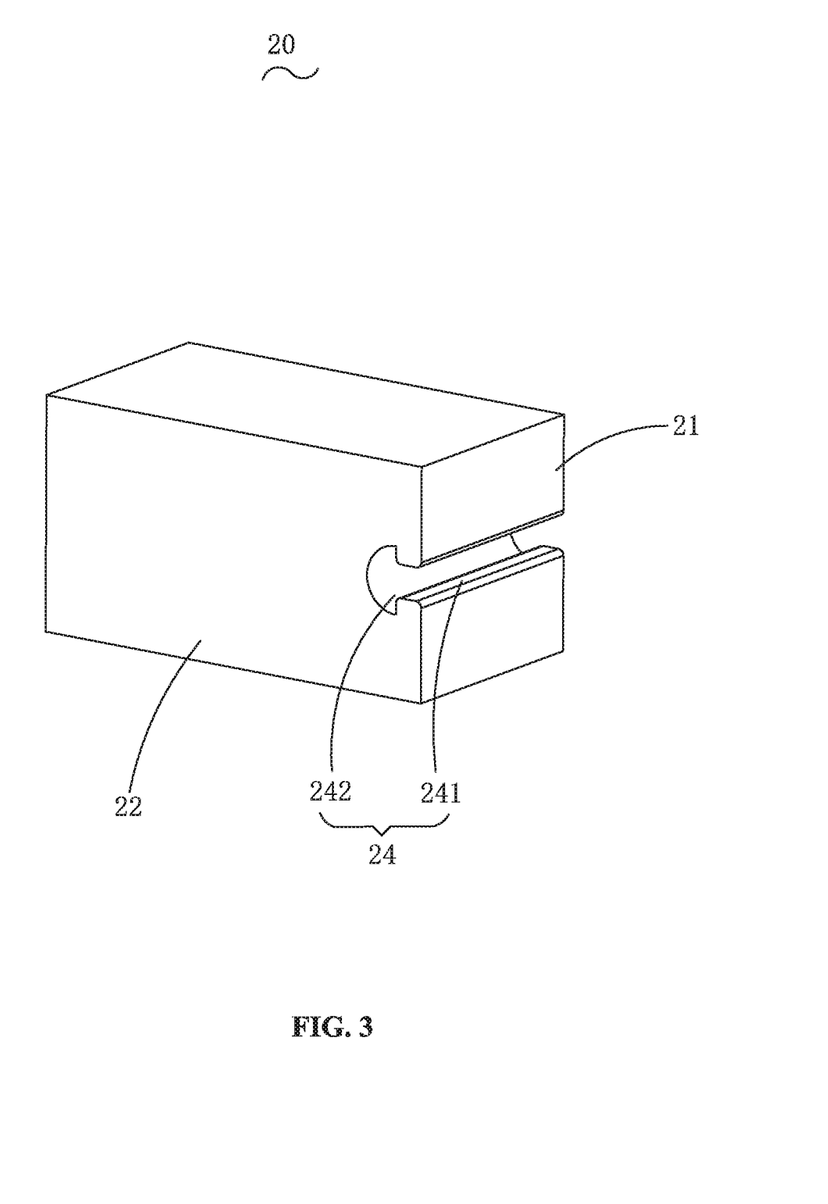
FIG. 3 is a three-dimensional view of a mover provided in the embodiment of the present disclosure.

Referring to FIG. 2 and FIG. 3, the mover 20 is a rectangular structure. The mover 20 has a first side surface 21, a second side surface 22 and a third side surface 23. Herein, two side edges of the first side surface 21 are respectively connected with the second side surface 22 and the third side surface 23. The third side surface 23 and the second side surface 22 are disposed opposite to each other. The mover 20 is provided with a slot 24 which is disposed as extending from the first side surface 21 into the mover 20. The other end of the elastic connector 30 is detachably connected with the slot 24.

Figure 4:
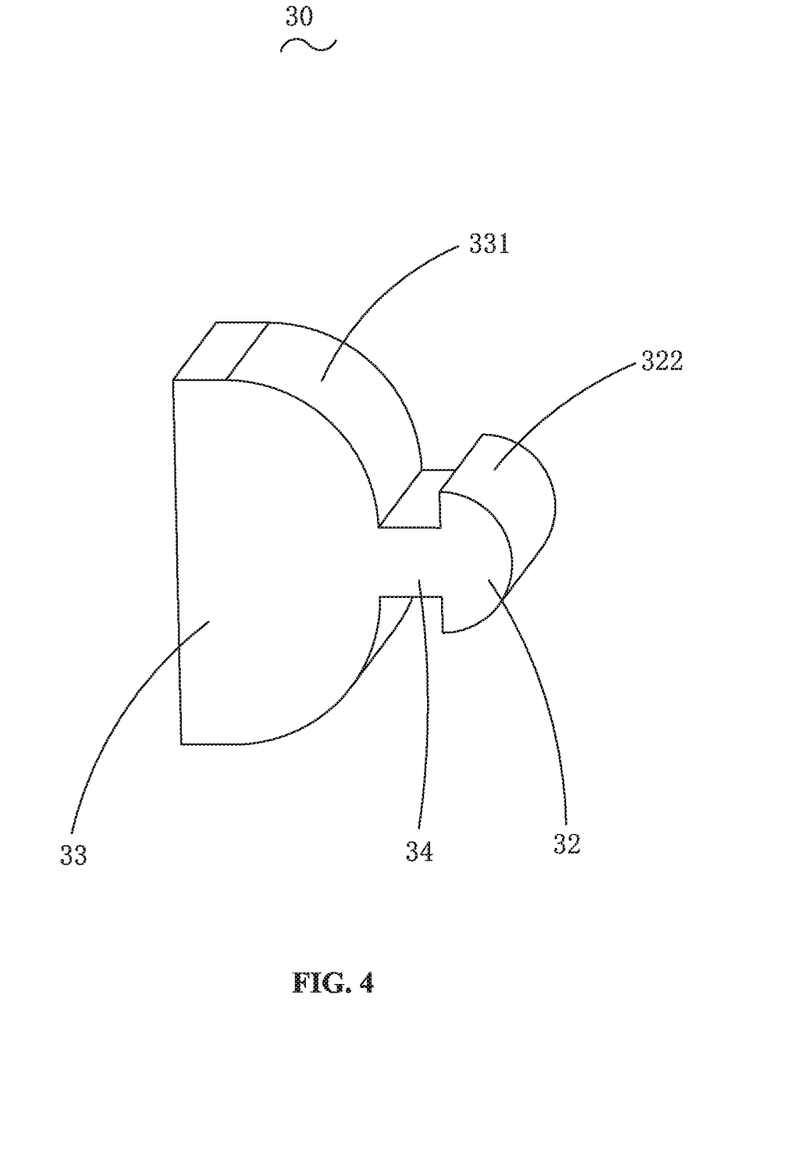
FIG. 4 is a three-dimensional view of an elastic connector according to an embodiment of the present disclosure.

Referring to FIG. 1 and FIG. 4, specifically, the elastic connector 30 includes a first end 31 connected with the stator 10, a second end 32 connected with the mover 20, and at least two transition-connecting portions connected between the first end 31 and the second end 32. The first end 31 is connected with an inner side wall of the frame 11. The at least two transition-connecting portions extend from the first end 31 towards the second end 32 with sequentially decreasing sizes, in order to enable the elastic connector 30 to draw when stressed.

Preferably, the at least two transition-connecting portions include a first transition-connecting portion 33 connected with the first end 31, and a second transition-connecting portion 34 connected between the first transition-connecting portion 33 and the second end 32, a size of the first transition-connecting portion 33 being greater than a size of the second transition-connecting portion 34. Both the second transition-connecting portion 34 and the second end are embedded into the slot 24, and the first transition-connecting portion 33 is outside the slot 24.

The second end 32 includes a rectangular plane 321 connected with the second transition-connecting portion 34, and a first arc surface 322 having two ends respectively connected with edges of two opposite sides of the rectangular plane 321. An end surface of the second end 32 that the end surface being close to the second transition-connecting portion 34 is larger than an end surface of the second transition-connecting portion 34 that the end surface being close to the second end 32. The slot 24 includes a first installation slot 241 and a second installation slot 242 that extend sequentially from the first side surface 21 into the mover 20. Both the first installation slot 241 and the second installation slot 242 extend to the second side surface 22. The second end 32 is seized in the second installation slot 242. The second transition-connecting portion 34 passes through the first installation slot 241 and is connected with the second end 32 to form a clasping connection with the slot 24.

Preferably, the first end 31 is a rectangular structure. The first transition-connecting portion 33 includes two second arc surfaces 331 which respectively extend to edges of two opposite sides of the second transition-connecting portion 34 from edges of two opposite sides of the first end 31 with a decreasing distance between the two second arc surfaces 331. In order to facilitate installing the second end 32 and the second transition-connecting portion 34, both the first installation slot 241 and the second installation slot 242 are disposed through the second side surface 22 and the third side surface 23.

The present disclosure further provides a motor having the nonlinear spring connection structure 1 as described above.

Figure 5:
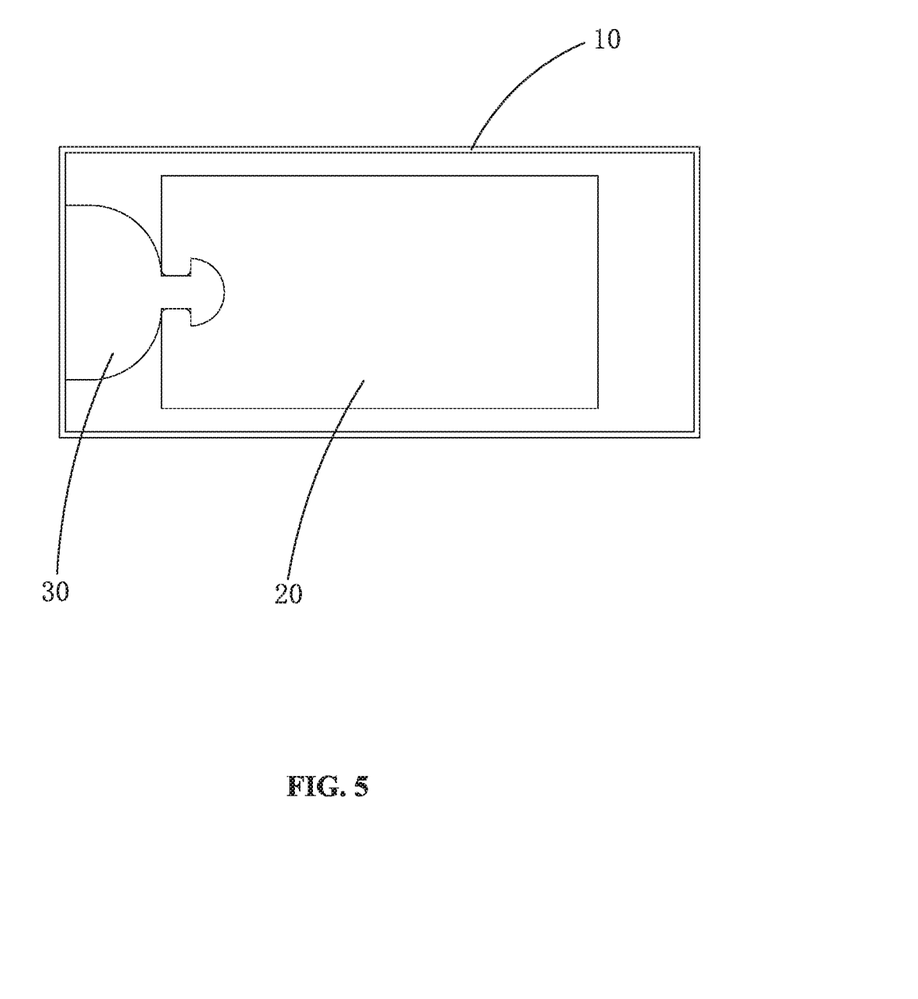
FIG. 5 is a front view of the elastic connector in the nonlinear spring connection structure at a static state according to an embodiment of the present disclosure.

Referring to FIG. 5, in the embodiment, when the mover 20 is at a static state, the elastic connector 30 are respectively connected to the stator 10 and the mover 20 through the first end 31 and the second end 32, so as to maintain an installation position thereof.

Figure 6:
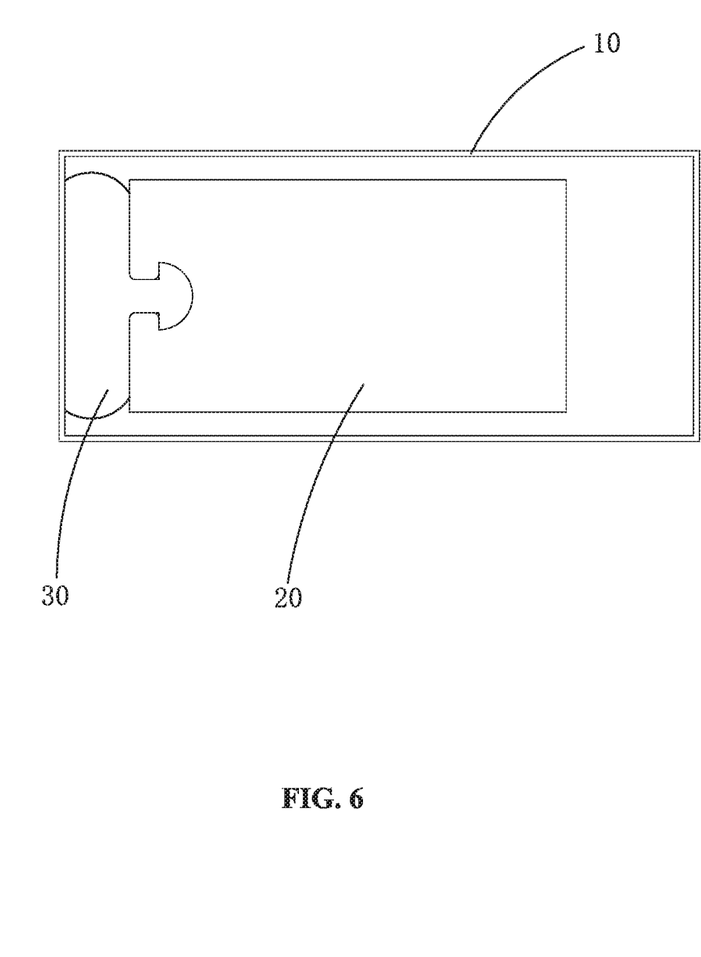
FIG. 6 is a front view of the elastic connector in the nonlinear spring connection structure in a compressing motion according to an embodiment of the present disclosure.

Referring to FIG. 6, when the mover 20 moves to the left, because the second transition-connecting portion 34 of the elastic connector 30 and the second end 32 are both embedded in the mover 20, sizes of the second transition-connecting portion 34 and the second end 32 cannot be compressed, but only a size of the first transition connecting portion 33 can be compressed, and thus stiffness of the elastic connector 30 is great.

Figure 7:
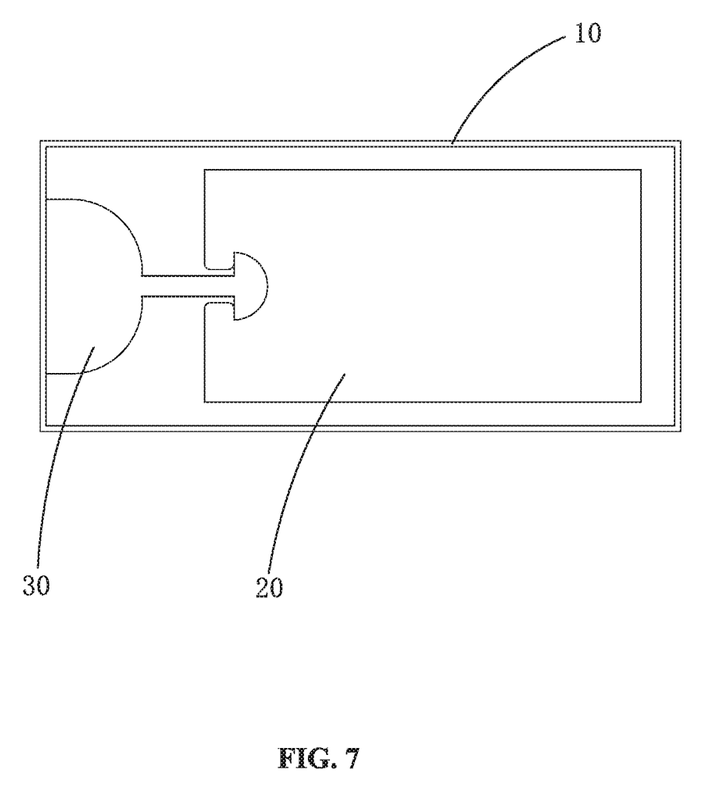
FIG. 7 is a front view of the elastic connector in the nonlinear spring connection structure in a drawing motion according to an embodiment of the present disclosure.
Figure 8:
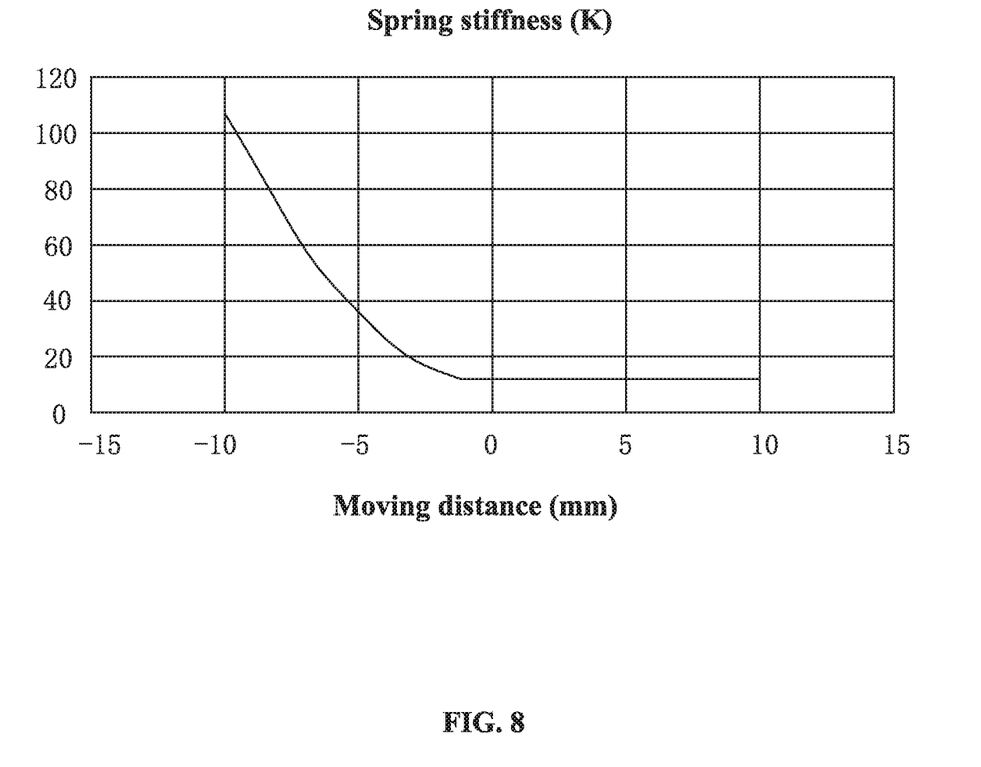
FIG. 8 is a schematic diagram showing stiffness of the elastic connector running at varied phases according to an embodiment of the present disclosure.

Referring to FIG. 7 and FIG. 8, when the elastic connector 30 is at a drawing state, because the size of the second transition-connecting portion 34 of the elastic connector 30 is smaller than that of the first transition-connecting portion 33, the second transition-connecting portion 34 is deformed. At this time, a moving stillness of the elastic connector 30 is low. A particular stiffness value in the present disclosure may be designed according to a practical requirement, and FIG. 8 may be referred to.

The above are only embodiments of the present disclosure. It shall be indicated that those of ordinary skill in the art can make improvements without departing from the creative concept of the present disclosure, and these belong to the protection scope of the present disclosure.

What is claimed is:

1. A nonlinear spring connection structure, comprising,
a stator,
a mover, and an elastic connector provided between the stator and the mover;

wherein the elastic connector comprises a first end connected with the stator, a second end connected with the mover, and at least two transition-connecting portions connected between the first end and the second end; and the at least two transition-connecting portions extending from the first end towards the second end with sequentially decreasing sizes;

wherein the at least two transition-connecting portions comprise a first transition-connecting portion connected with the first end, and a second transition-connecting portion connected between the first transition-connecting portion and the second end, a size of the first transition-connecting portion being greater than a size of the second transition-connecting portion;

wherein the mover has a first side surface and a second side surface that are adjacently connected with each other; the mover is provided with a first installation slot and a second installation slot that extend sequentially from the first side surface into the mover; both the first installation slot and the second installation slot extend to the second side surface; the second end is seized in the second installation slot, and the second transition-connecting portion passes through the first installation slot.

2. The nonlinear spring connection structure according to claim 1, wherein an end surface of the second end that is close to an end surface of the second transition-connecting portion is larger than the end surface of the second transition-connecting portion that is close to the end surface of the second end.

3. The nonlinear spring connection structure according to claim 1, wherein the mover further has a third side surface adjacently connected with the first side surface and disposed opposite to the second side surface, the first installation slot and the second installation slot are disposed through the second side surface and the third side surface.

4. The nonlinear spring connection structure according to claim 1, wherein the second end comprises a rectangular plane connected with the second transition-connecting portion, and a first arc surface having two ends respectively connected with edges of two opposite sides of the rectangular plane.

5. The nonlinear spring connection structure according to claim 1, wherein the second transition-connecting portion and the first end are rectangular structures; the first transition-connecting portion comprises two second arc surfaces, and the two second arc surfaces respectively extend to edges of two opposite sides of the second transition-connecting portion from edges of two opposite sides of the first end with a decreasing distance between the two second arc surfaces.

6. The nonlinear spring connection structure according to claim 1, wherein the elastic connector is a part integrally made of elastic rubber.

7. The nonlinear spring connection structure according to claim 2, wherein the elastic connector is a part integrally made of elastic rubber.

8. The nonlinear spring connection structure according to claim 1, wherein the stator comprises a frame, the mover is provided in the frame, and the first end is connected with an inner side wall of the frame.

* * * * *